United States Patent
Kunz et al.

(10) Patent No.: US 10,358,949 B2
(45) Date of Patent: Jul. 23, 2019

(54) CAMSHAFT

(71) Applicant: ThyssenKrupp Presta TecCenter AG, Eschen (LI)

(72) Inventors: Michael Kunz, Chemnitz (DE); Martin Lehmann, Mittelndorf (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 71 days.

(21) Appl. No.: 15/310,711

(22) PCT Filed: Apr. 14, 2015

(86) PCT No.: PCT/EP2015/058068
§ 371 (c)(1),
(2) Date: Nov. 11, 2016

(87) PCT Pub. No.: WO2015/176874
PCT Pub. Date: Nov. 26, 2015

(65) Prior Publication Data
US 2017/0081984 A1    Mar. 23, 2017

(30) Foreign Application Priority Data
May 20, 2014  (DE) ........................ 10 2014 007 287

(51) Int. Cl.
*F01L 1/04*       (2006.01)
*F01L 1/047*      (2006.01)
(Continued)

(52) U.S. Cl.
CPC ........... *F01L 1/047* (2013.01); *F01L 13/0015* (2013.01); *F16H 53/04* (2013.01);
(Continued)

(58) Field of Classification Search
CPC .................. F01L 1/047; F01L 13/0015; F01L 2001/0473; F01L 2001/0476; F01L 2013/0052; F16H 53/04
See application file for complete search history.

(56) References Cited

U.S. PATENT DOCUMENTS 8,191,524 B2 * 6/2012 Elendt ................. F01L 13/0036
                                                    123/90.16
8,584,641 B2 * 11/2013 Shewell ................ F01L 1/047
                                                    123/90.16
(Continued)

FOREIGN PATENT DOCUMENTS

DE       42 36 655 A        5/1994
DE    102004011586 A1     10/2004
(Continued)

OTHER PUBLICATIONS

Int'l Search Report for PCT/EP2015/058068 dated Jun. 11, 2015 (dated Jun. 19, 2015).
(Continued)

*Primary Examiner* — Thomas C Diaz
(74) *Attorney, Agent, or Firm* — thyssenkrupp North America, Inc.

(57) ABSTRACT

A camshaft may have a bearing shaft configured as a hollow shaft in which an inner shaft is disposed concentrically relative to the bearing shaft. The inner shaft may be twistable relative to the bearing shaft. A first cam segment having a first recess for receiving the bearing shaft may be disposed on the bearing shaft, may be rotatable relative to the bearing shaft, and may be connected in a rotationally fixed and axially fixed manner to the inner shaft. A second cam segment having a second recess for receiving the bearing shaft may be disposed on the bearing shaft. The second cam segment may have at least two cam contours and may be fastened on the bearing shaft so that the second cam segment is rotationally fixed to the bearing shaft and arranged in an axially displaceable manner on the bearing shaft.

17 Claims, 6 Drawing Sheets

(51) Int. Cl.
 *F01L 13/00* (2006.01)
 *F16H 53/04* (2006.01)
(52) U.S. Cl.
 CPC .................. *F01L 2001/0473* (2013.01); *F01L 2001/0476* (2013.01); *F01L 2013/0052* (2013.01)

(56) References Cited

U.S. PATENT DOCUMENTS 8,695,547 B2 * 4/2014 Weinmeister ............. F01L 1/04
 123/90.16
2013/0104824 A1 5/2013 Weinmeister

FOREIGN PATENT DOCUMENTS

| DE | 102007051739 A1 | 5/2009 |
|---|---|---|
| DE | 10 2010 011 897 A | 9/2011 |
| DE | 102010033087 A1 | 2/2012 |
| DE | 102011051480 A1 | 1/2013 |
| DE | 102011085707 A1 | 5/2013 |
| EP | 1696107 A1 | 8/2006 |

OTHER PUBLICATIONS

English Language Abstract for DE102010033087A1.
English Language Abstract for DE102011051480A1.
English Language Abstract for DE102007051739A1.

* cited by examiner

CAMSHAFT

CROSS REFERENCE TO RELATED APPLICATIONS

This application is a U.S. National Stage Entry of International Patent Application Serial Number PCT/EP2015/058068, filed Apr. 14, 2015, which claims priority to German Patent Application No. DE 10 2014 007 287.8 filed May 20, 2014, the entire contents of both of which are incorporated herein by reference.

FIELD

The present disclosure relates to camshafts for actuating cylinder valves of combustion engines.

BACKGROUND

In order to improve the efficiency of combustion engines, it is known from the prior art to adapt the cams of a camshaft to the operating state of a combustion engine. For example, DE 10 2004 011 586 A1 discloses a sliding cam system having axially movable cam brackets, in order to enable switching to a differently shaped cam contour by moving the cam bracket. The duration and stroke of the valve actuation can thus be changed, for example. On the other hand, it is known from EP 1 696 107 A1 to design a cam so as to be twistable, in that the cam is twistably attached to a bearing shaft and connected via a pin to an inner shaft which can be twisted relative to the bearing shaft. The angle position and, consequently, the switching point for the cylinder valve can thus be changed.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element. Similarly, it should be understood that the steps of any method claims need not necessarily be performed in the order in which they are recited, unless so required by the context of the claims.

An object of the present invention is to provide a novel camshaft by means of which the switching time of the cylinder valves can be varied relative to each other, as can the duration and the stroke of the valve actuation, in order to achieve even better adaptation to the current operating state of the combustion engine, and to thus increase the efficiency of the combustion engine.

Said object is solved by a camshaft having a bearing shaft designed as a hollow shaft, in the interior of which an inner shaft is concentrically arranged to the bearing shaft. According to the invention, the inner shaft is twistable relative to the bearing shaft. Furthermore, a first cam segment having a first recess for receiving the bearing shaft is arranged on the bearing shaft and is rotatable relative to the bearing shaft and is connected in a rotationally fixed and axially fixed manner to the inner shaft by a connection means. Furthermore, a second cam segment having a second recess for receiving the bearing shaft is arranged on the bearing shaft. According to the invention, the second cam segment has at least two cam contours and is fastened on the bearing shaft so that the second cam segment is, first of all, rotationally fixed to the bearing shaft and, second of all, arranged in an axially movable manner on the bearing shaft.

A rotationally fixed connection between a cam segment and a shaft in terms of this application is considered to mean that the cam segment cannot be twisted relative to the shaft. Accordingly, an axially fixed connection between a cam segment and a shaft is considered to mean that the cam segment cannot be axially moved relative to the shaft.

Said combination enables a particularly flexible activation of the cylinder valves. On the one hand, by twisting the inner shaft relative to the bearing shaft, the angle position between the cam contours of the first and second cam segment can be varied so that the time duration between the corresponding activation of the valves can be variably adjusted. On the other hand, displacing the second cam segment in the axial direction can switch between different cam contours. Since the second cam segment has at least two axially spaced cam contours, the axial displacement can be utilized to choose which of the cam contours is active. A cam contour is denoted as active if it is located in the correct axial position in order to activate a cylinder valve during operation of the camshaft. By axial displacement of the second cam segment, the second cam contour moves to the axial position of the first cam contour, for example, so that the second cam contour is then active, while the first cam contour was previously active. Since the cam contours of the second cam segment typically differ from each other, enormous variability in the cylinder activation results.

The connection means is connected to the inner shaft and extends through a first opening in the bearing shaft and engages in an opening of the first cam segment. In this way, the connection means connects the first cam segment to the inner shaft. In order that the connection means does not hinder the twisting of the inner shaft relative to the bearing shaft, the first opening in the circumferential direction is larger than the diameter of the connection means. The first opening is thus designed in the form of an oblong hole. The oblong hole extends further along the circumference the larger the desired twisting angle range between the inner shaft and the bearing shaft.

The connection means can particularly be a pin which is pressed into the inner shaft. Alternatively, the connection means can also be a screw which is screwed into the inner shaft.

In this application, the second cam segment is only described having two cam contours, as an example. However, the second cam segment can also have three or more cam contours. A zero stroke, in which no activation of the corresponding cylinder valve occurs, is likewise designated as a cam contour.

The first and the second cam segment can be integrally designed or combined from a plurality of components. Components made of different materials can also be used. Such combined cam segments are known, for example, from DE102011051480A1.

The distance between the first and the second cam segment is typically such that both cam segments act on valves of the same cylinder.

"Axial direction," in terms of this application, is considered to mean a direction that extends parallel to the rotation axis of the camshaft. The circumferential direction extends perpendicular to the rotation axis along a circumference of the camshaft.

It is advantageous if the camshaft comprises a latching means which latches the second cam segment to one of the plurality of axial positions. This ensures a stable working condition in which no unintentional displacements of the second cam segment occur.

In one embodiment, the latching means is arranged within the inner shaft, at least in part. Sufficient installation space for the latching means is thus provided. In the prior art, displaceable cam segments having latching means have only been used in bearing shafts that are massive, such as in DE 10 2004 011 586 A1. In camshafts that comprise hollow shafts as bearing shaft, it is difficult to provide sufficient installation space for the latching means. On the one hand, sufficient installation space is required in order to design the latching means large enough so that sufficiently strong fastening force is provided. On the other hand, however, too much material of the bearing shaft may not be removed, so that the load-bearing capacity of the bearing shaft is retained and is not weakened too much. As a result of this problem, displaceable cam segments have not previously been able to be used in camshafts having a hollow shaft as a bearing shaft. According to the invention, said problem is solved in that the latching means is arranged within the inner shaft, at least in part. On the one hand, sufficient installation space for the latching means is thus available and, on the other hand, the load-bearing capacity of the bearing shaft is not too severely reduced.

In an additional embodiment, the latching means latches the second cam segment opposite the inner shaft. This has the advantage that the relative position of the first cam segment and second cam segment is more easily defined. Since the first cam segment is connected both in a rotationally fixed and axially fixed manner to the inner shaft, a latching of the second cam segment relative to the inner shaft causes the distance between the first cam segment and the second cam segment to be defined via the inner shaft. In this way, the axial distance of the two cam segments can be precisely defined.

One possibility for designing the latching means is to provide a bore in the inner shaft together with a spring-loaded latching body, which is mounted so as to move in the radial direction. The latching body extends through a latching opening in the bearing shaft and engages in a latching groove in the inner side of the second recess of the second cam segment. Since the inner shaft can be twisted within the bearing shaft, it is necessary that the latching opening in the bearing shaft and the latching groove each have an extension in the circumferential direction which is larger than the extension of the latching body in the circumferential direction. A twisting of the inner shaft relative to the bearing shaft is thus not hindered by the latching body.

The different latching grooves are preferably designed completely circumferentially in order to enable simpler manufacturing.

In a variant of the camshaft, the second recess of the second cam segment and the outside of the bearing shaft have indentations which are opposite each other, producing hollow chambers in which bearing bodies are arranged. The torsional stability of the second cam segment relative to the bearing shaft is thus ensured. Simultaneously, in contrast to a gearing, there is no axial region of the bearing shaft having an increased diameter. The bearing shaft can therefore also be inserted into closed bearing receptacles without problems. In order to enable an axial displacement of the second cam segment on the bearing shaft, the indentations on the inner side of the second recess or the indentations on the outside of the bearing shaft in the axial direction have, in this case, a larger extension than the bearing bodies. The bearing bodies slide in said indentations when displacing the second cam segment. The torsional stability is supported in that the indentations on the inside of the second recess and the indentations on the outside of the bearing shaft in the circumferential direction have an extension which substantially corresponds to the extension of the bearing bodies in said direction, in order to prevent twisting of the second cam segment relative to the bearing shaft.

During assembly of the camshaft according to the invention, the inner shaft is first arranged within the bearing shaft. In a next step, the latching means is arranged within the inner shaft, at least in part. Furthermore, the latching bodies are placed in the indentations on the outside of the bearing shaft. In a preferred variant, the indentations on the inside of the second recess of the second cam segment extend over the complete axial extension of the second cam segment. In this case, the second cam segment can then be easily pushed onto the bearing shaft, so that the placed bearing bodies engage with the indentations on the inner side of the second recess. The spring of the latching means is initially compressed when being pushed on in order to enable the displacement. At the allocated axial position, the spring then engages the latching body together with the corresponding latching groove and thereby fixates the axial position.

The assembly of the camshaft can, on the one hand, occur separately, so that the finished camshaft can be inserted into open bearing receptacles of a combustion engine. Alternatively, the camshaft can also be mounted within closed bearing receptacles having a recess for receiving the bearing shaft. To this end, the first cam segment, the second cam segment and the closed bearing receptacles are aligned in the desired sequence so that the recesses for receiving the bearing shaft extend along an axis. The bearing shaft and inner shaft are then pushed together along said axis through the aligned recesses so that the camshaft emerges in the closed bearing receptacles. The inserting of latching means and bearing bodies can, in this case, occur before or after the inserting of the bearing shaft and inner shaft into the aligned components.

In the case of this assembly method, the first and second cam segment are also displaced opposite the bearing shaft again, after insertion of the bearing shaft and inner shaft, until both said segments have reached the final axial positions thereof.

The bearing of the camshaft in the combustion engine can occur on the bearing shaft or on one of the cam segments.

It is particularly advantageous if the first cam segment or the second cam segment comprises a region which is designed as a bearing point for bearing the camshaft in a bearing receptacle of a combustion engine. For example, said region can be a collar of the first or the second cam segment which is designed as a bearing point. It is likewise possible that an adjustment region of the second cam segment having a groove-shaped slotted link track, described in the following, is designed as a bearing point.

The bearing bodies can be bearing needles or balls, for example.

In an alternative variant, intermeshing gearings are arranged on the inner side of the second recess and on the outside of the bearing shaft. The tooth grooves of the gearing extend in the axial direction, so that an axial displacement of the second cam segment on the bearing shaft is enabled and a twisting of the second cam segment relative to the bearing shaft is prevented. A gearing can be relatively easily produced and requires no additional insertion of bearing bodies. For example, the gearing can be designed on the outside of the bearing shaft in the form of a pressed-on gear ring.

In a design variant of the camshaft according to the invention, the second cam segment has at least one first slotted link track for moving the first cam segment in a first axial direction and a second slotted link track for moving the second cam segment in a second axial direction. According to the invention, the second axial direction is opposite the first axial direction.

Slotted link tracks are easily produced means for inducing the displacement of elements on rotating shafts. The already existing rotational movement of the shaft is utilized in that a stationary means, such as a driving pin, is brought into contact with the slotted link track of the element. The slotted link track extends at an angle to the circumferential direction, at least in regions (that is, neither along the circumferential direction nor along the axial direction). During rotation of the shaft, the slotted link track slides along on the pin. Since the pin is stationary, a force is exerted on the slotted link track by the rotation which has force components in the axial direction and in the circumferential direction. A movement of the slotted link track in the circumferential direction (that is, a twisting of the slotted link track) is normally ruled out in that the element is attached in a rotationally fixed manner on the shaft. A force component in the axial direction thus remains, which leads to a displacement of the slotted link track, and thus to a displacement of the element.

Slotted link tracks can be designed in two different types. First of all, it is possible to design the slotted link track to have a groove shape. In the groove-shaped slotted link track, a stationary pin can be used to displace the element. The slotted link track extends at an angle to the circumferential direction, at least in regions (that is, neither along the circumferential direction nor in the axial direction). A screw-shaped course having a constant incline of the helical track or a screw-shaped course having varying incline are possible, for example. Additional, complex courses are likewise possible.

On the other hand, the slotted link track can also be designed in the form of a face of the second cam segment, extending at an angle at least in regions. Space for a groove on the second cam segment is thereby saved.

It is thus possible to design both the first slotted link track and the second slotted link track in a groove shape, or to design the first slotted link track and the second slotted link track in the form of a face of a cam segment facing away from the other respective cam segment and extending at an angle at least in regions. Hybrid forms are likewise possible, in which one slotted link track is formed as a groove extending at an angle and the other slotted link track is designed as a face extending at an angle in regions.

Figure 1:
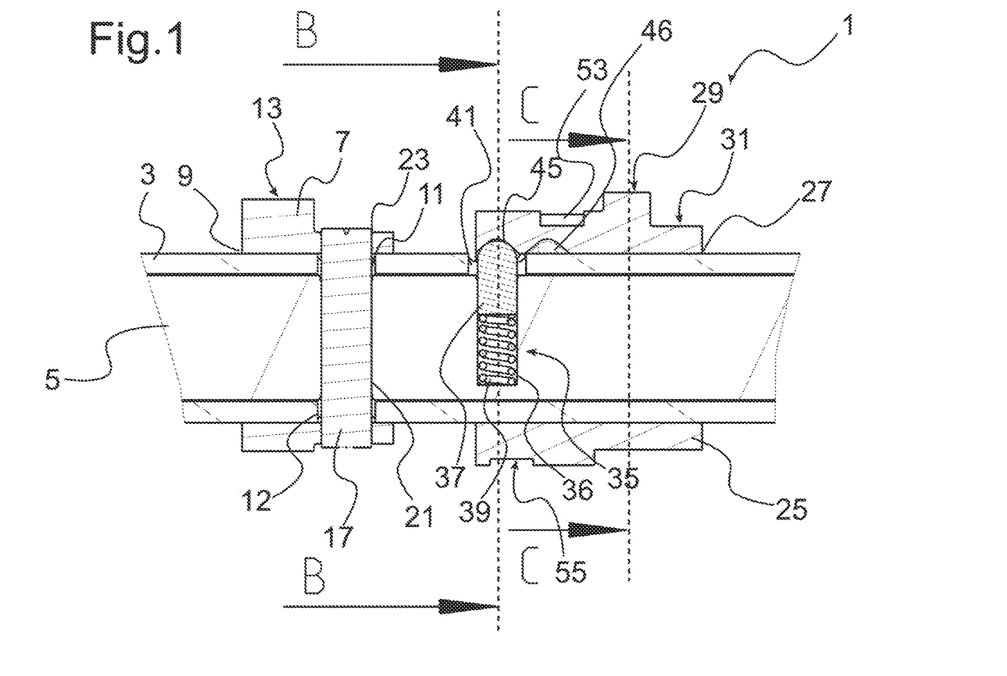
FIG. 1 is a longitudinal section view of a first example camshaft.
Figure 2:
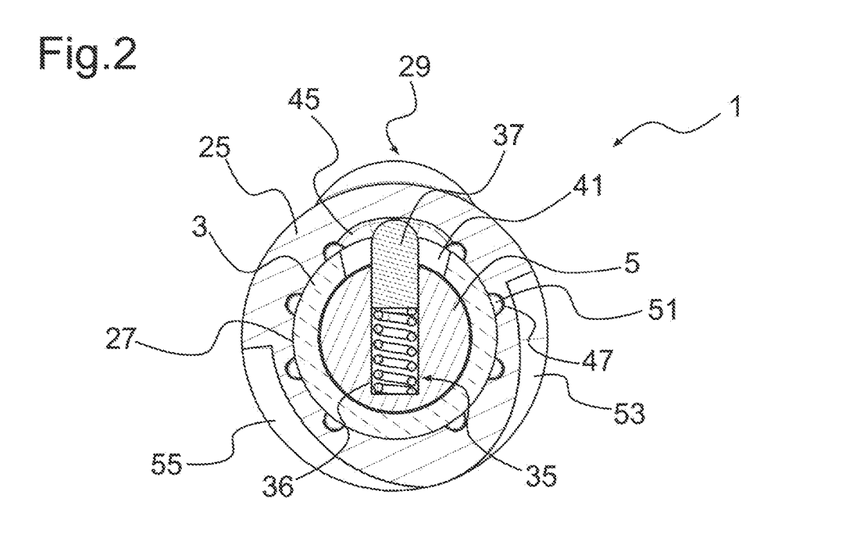
FIG. 2 is a cross-sectional view of the first example camshaft.
Figure 3:
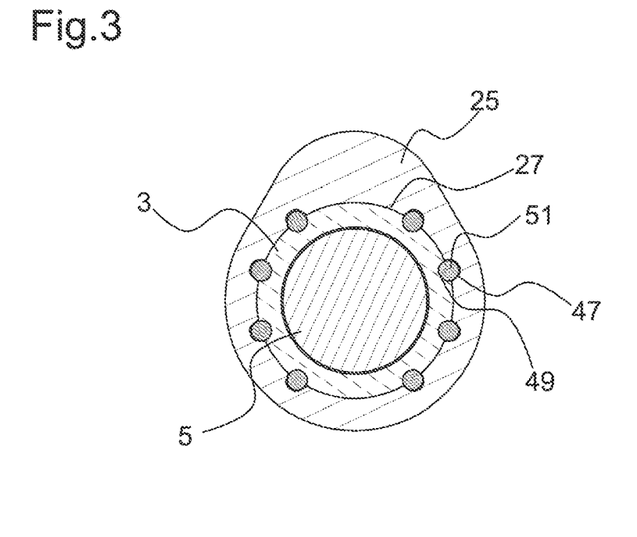
FIG. 3 is another cross-sectional view of the first example camshaft.

With reference now to the figures, the section planes shown in FIGS. 1, 6, 8, 9, 10 and 11 each include the rotation axis of the camshaft, whereas the section planes of FIGS. 2 and 3 are perpendicular to the rotation axis.

FIG. 1 shows a longitudinal section of the camshaft 1. The camshaft 1 comprises a bearing shaft 3, which is designed as a hollow shaft, and an inner shaft 5, which is arranged concentrically to the bearing shaft 3. According to the invention, the inner shaft 5 is twistable relative to the bearing shaft 3. A first cam segment 7 having a first recess 9 for receiving the bearing shaft 3 is arranged on the bearing shaft 3. The first cam segment 7 is connected to the inner shaft 5 in a rotationally fixed and axially fixed manner by means of the connection means 17. The connection means 17 extends through a first opening 11 in the bearing shaft 3 and engages in an opening 23 of the first cam segment 7, thus connecting the first cam segment 7 to the inner shaft 5. The first cam segment 7 is rotatable in respect of the bearing shaft 3. Upon twisting the inner shaft 5 relative to the bearing shaft 3, the first cam segment 7 is thus twisted in respect of the bearing shaft 3. In order that the connection means 17 does not hinder the twisting of the inner shaft 5 relative to the bearing shaft 3, the first opening 11 in the circumferential direction is larger than the diameter of the connection means 17. Thereby, the first opening 11 is designed in the form of an oblong hole. The oblong hole extends further along the circumference the larger the desired twisting angle range between the inner shaft 5 and the bearing shaft 3. The inner shaft 5 has a bore 21 for receiving the connection means 17. The connection means 17 extends through the first opening 11 in the bearing shaft 3 and engages in an opening 23 of the first cam segment 7.

In the embodiment shown, the bore 21 is designed as a continuous bore and the connection means 17 is designed in the form of a pin, extends through the first opening 11 and a second opening 12, which is opposite the first opening 11, wherein the connection means 17 engages by means of the opposing ends thereof in two openings 23 of the first cam segment 7. Instead of such a symmetrical design, it is also possible to design the bore 21 in the form of a blind hole, so that only one side of the connection means 17 extends through a first opening 11 in the bearing shaft 3 and engages in an opening 23. During assembly, the opening 23 is overlapped together with the openings 11 and 12 and the bore 21. The connection means 17, in the form of a pin, is then pressed into the bore 21 and the openings 11 and 12, so that a press fit results, which connects the first cam segment 7 to the inner shaft 5 in a rotationally fixed and axially fixed manner.

A second cam segment 25 is arranged on the bearing shaft 3 adjacent to the first cam segment 7. The second cam segment 25 has a second recess 27 for receiving the bearing shaft 3, a first cam contour 29 and a second cam contour 31, which are offset to each other in the axial direction. In the configuration of the camshaft 1 shown in FIG. 1, the second cam segment 25 is located at an axial position, so that the first cam contour 29 is active. This means that, in the installed state of the camshaft 1 in a combustion engine, a cylinder valve is activated by the cam contour 29. The cam contour 31, however, is not active. This means that the cam contour 31 is not located at the correct axial position in order to be able to activate a cylinder valve. According to the invention, the second cam segment 25 can be axially displaced relative to the inner shaft 5 and to the bearing shaft 3. The second cam segment 25 can thus be displaced to the left (in this depiction) so that the second cam contour 31 moves to the axial position of the first cam contour 29. In this case, the second cam contour 31 would then be active, since it is at the correct axial position in order to effect an activation of a cylinder valve. In the embodiment shown, however, the second cam contour is designed as a zero stroke, as an example, so that even if the second cam contour 31 is active, no cylinder activation occurs. The displacement of the second cam segment 25 thus has the effect that the allocated cylinder valve is no longer activated. A cylinder deactivation occurs. Instead of a cylinder deactivation, the displacement of the second cam segment 25 can alternatively also switch to a different operating mode. In such a case, both the first cam contour 29 and the second cam contour 31 are designed so that they activate the cylinder valve in the respective active position. The two cam contours 29 and 31 then differ, for example, in the stroke height, so that the cylinder valve is activated with different intensity depending on the position of the second cam segment 25, or in the angle position, so that the cylinder valve is activated at different times depending on the position of the second cam segment 25. It is also possible that the cam contours have a different width, so that the activation duration of the cylinder valve differs.

In order to fixate the second cam segment 25 at the desired axial position, there is a latching means 35 which latches the second cam segment 25 at a plurality of axial positions. The latching means 35 comprises a bore 36 in the inner shaft 5 having a spring-loaded latching body 37. The latching means 35 is thus arranged at least in part inside the inner shaft 5. The latching body 37 is mounted so as to move in the radial direction. Said radial movement of the latching body 37 occurs under compression of the spring 39. The spring-loaded latching body 37 extends through a latching opening 41 in the bearing shaft 3 and engages in a latching groove 45 in the inner side of the second recess 27 of the second cam segment 25. If the second cam segment 25 is displaced toward the second operating mode (that is, to the left), the spring 39 is first compressed in order to enable the displacement. At the allocated axial position, the spring 39 then engages the latching body 37 together with the other latching groove 46 and thereby fixates the axial position. Both the latching opening 41 and the two latching grooves 45 and 46 each have an extension in the circumferential direction which is larger than the extension of the latching body 37 in the circumferential direction, so that the latching body 37 does not hinder a twisting of the inner shaft 5 relative to the bearing shaft 3. The latching grooves 45 and 46 can also be designed to be completely circumferential. This then enables a simpler method of production. In this embodiment, the bore 36 for the latching body 37 extends parallel to the bore 21 for the connection means 17. This has the advantage that the two bores 21 and 36 can be made without twisting the inner shaft between the boring steps. The diameters of the two bores 21 and 36 naturally must not be equal. In principle, however, any angle between the two bores is possible. Furthermore, the two bores 21 and 36 and, therefore, the connecting means 17 and the movement direction of the latching body 37 do not necessarily have to extend radially. A slanted course having components in the axial direction and radial direction is also possible.

The axial displacement of the second cam segment 25 is produced by means of a first slotted link track 53 and a second slotted link track 55. The operating principle of the slotted link tracks 53 and 55 is explained in greater detail below, with reference to FIG. 4.

FIG. 2 shows a cross section through the camshaft 1, wherein the section plane extends perpendicular to the rotation axis and includes the line B-B, which is shown in FIG. 1. FIG. 2 clearly shows the bearing shaft 3, in the interior of which the inner shaft 5 is twistably arranged. The latching means 35 is partially arranged in the interior of the inner shaft 5. The latching means 35 comprises a pocket bore 36 in the inner shaft having a spring-loaded latching body 37. The second cam segment 25 is arranged on the bearing shaft 3. A latching groove 45 is arranged on the inner side of the second recess 27 of the second cam segment 25. The spring-loaded latching body 37 extends through a latching opening 41 in the bearing shaft 3 and engages in a latching groove 45 in the inner side of the second recess 27 of the second cam segment 25. Both the latching opening 41 and the two latching grooves 45 and 46 each have an extension in the circumferential direction which is larger than the extension of the latching body 37 in the circumferential direction, so that the latching body 37 does not hinder a twisting of the inner shaft 5 relative to the bearing shaft 3. In the depiction shown, the latching body 37 is located centrally in the latching opening 41 and the latching groove 45. The inner shaft 5 can thus be twisted in both directions in relation to the bearing shaft 3 by a certain amount without the latching body 37 hindering the rotation.

FIG. 2 furthermore shows indentations 47 on the inner side of the second recess 27 of the second cam segment 25. Since the indentations 47 extend over the complete axial extension of the second cam segment, the indentations can also be seen in the present section. The corresponding opposite indentations 49 (see FIG. 3) in the outer side of the bearing shaft 3 do not extend up to the section plane shown in FIG. 2, however, and are therefore not visible in FIG. 2. The bearing bodies 51 are shown lying in the indentations 49. Eight bearing bodies 51 are arranged distributed over the circumference in corresponding hollow chambers, formed by indentations 47 and 49. The present bearing bodies 51 are bearing needles. The use of different bearing bodies, such as ball bearings, is likewise possible.

FIG. 3 shows a cross section through the camshaft 1, wherein the section plane extends perpendicular to the rotation axis and this time includes the line C-C, which is shown in FIG. 1. In addition to the components already explained, FIG. 3 shows that indentations 47 are arranged on the inner side of the second recess 27 of the second cam segment 25. One indentation 49 is arranged on the outer side of the bearing shaft opposite each of the indentations 47, so that hollow chambers result, in which the bearing bodies 51 are arranged.

Based on FIGS. 2 and 3, it is clear that the indentations 47 on the inner side of the second recess 27 in the axial direction have a larger extension than the bearing bodies 51. In the present case, the indentations on the inside of the second recess 27 even extend over the complete axial extension of the second cam segment. Said difference in the extension results in the second cam segment being displaceable on the bearing shaft. Alternatively, the reverse setup is possible, wherein the indentations 49 on the outer side of the bearing shaft 3 have a larger axial extension than the bearing bodies 51. In the circumferential direction, by contrast, the two indentations 47 and 49 have an extension which substantially corresponds to the extension of the bearing bodies 51 in said direction, in order to prevent twisting of the second cam segment 25 relative to the bearing shaft 3.

Figure 4:
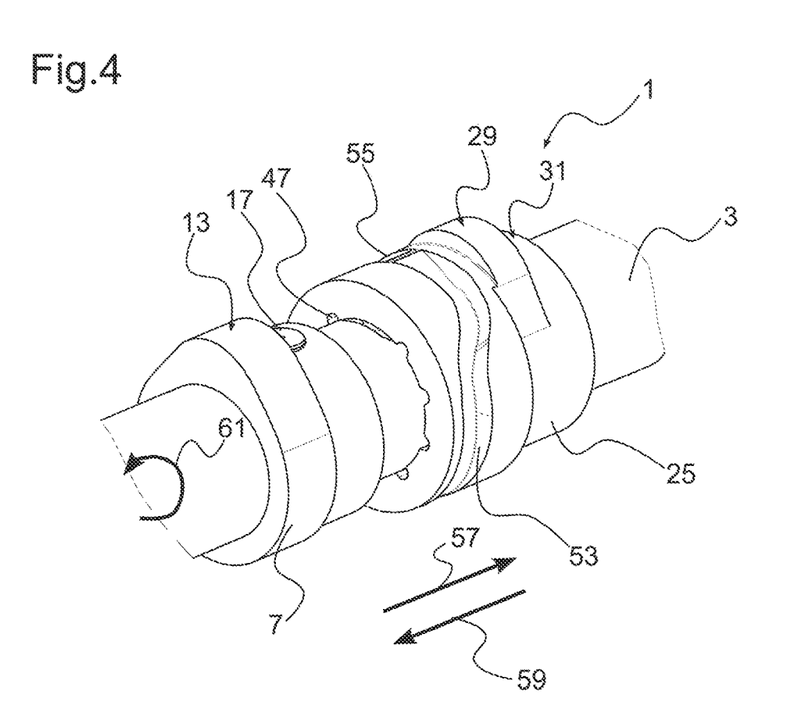
FIG. 4 is a perspective view of the first example camshaft.

The camshaft 1 according to the invention is shown in a three-dimensional depiction in FIG. 4. The first cam segment 7 is arranged on the bearing shaft 3 and is twistable in relation to the bearing shaft 3 and connected to the inner shaft in a rotationally fixed and axially fixed manner by means of the connection means 17. The first cam segment 7 has a first cam contour 13. The second cam segment 25 is arranged on the bearing shaft 3 adjacent to the first cam segment 7. The second cam segment 25 has a first cam contour 29 and a second cam contour 31. A first slotted link track 53 and a second slotted link track 55 are arranged on the second cam segment 25 adjacent to the first cam contour 29. The first slotted link track 53 serves to move the second cam segment 25 in a first axial direction 57, and the second slotted link track serves to move the second cam segment 25 in a second axial direction 59. The rotation direction of the camshaft 1 is denoted by 61 in FIG. 4. The cam contour 13 of the first cam segment thus moves away from the observer upon rotation of the camshaft 1. If a stationary pin is inserted into the first slotted link track 53 in the upper region in the case of this rotation direction, the slanted course of the first slotted link track 53 causes the second cam segment to move in the first axial direction 57 during a half rotation of the camshaft 1. The second slotted link track 55 also has a slanted course, wherein, however, the slotted link track has an angle opposite the circumferential direction. If the same stationary pin is inserted into the second slotted link track 55 of the second cam segment 25 (displaced in the first axial direction 57), the second cam segment 25 is moved in the second axial direction 59 during a half rotation of the camshaft 1. In principle, the courses of the first and second slotted link tracks 53 and 55 can be chosen so that the movement of the second cam segment 25 occurs during any fraction of a rotation. The change between two operating modes should occur between two successive activations of a cylinder valve. Therefore, the movement of the second cam segment 25 should be complete no later than after one revolution. The design according to the invention, having a first slotted link track 53 and a second slotted link track 55, each of which effect a movement during a half rotation, has the advantage that the two slotted link tracks can be arranged at the same axial position on opposite sides of the camshaft 1. This enables a very compact structural shape of the second cam segment 25. In the case of larger fractions of a rotation, this is not possible, since the slotted link tracks would then intersect. In that case, the slotted link tracks must be arranged offset to each other in the axial direction. On the other hand, smaller fractions of a rotation have the disadvantage that the activation of the stationary pin would have to be more precise the smaller the fraction. The movement during one half rotation thus represents a good compromise.

Figure 5:
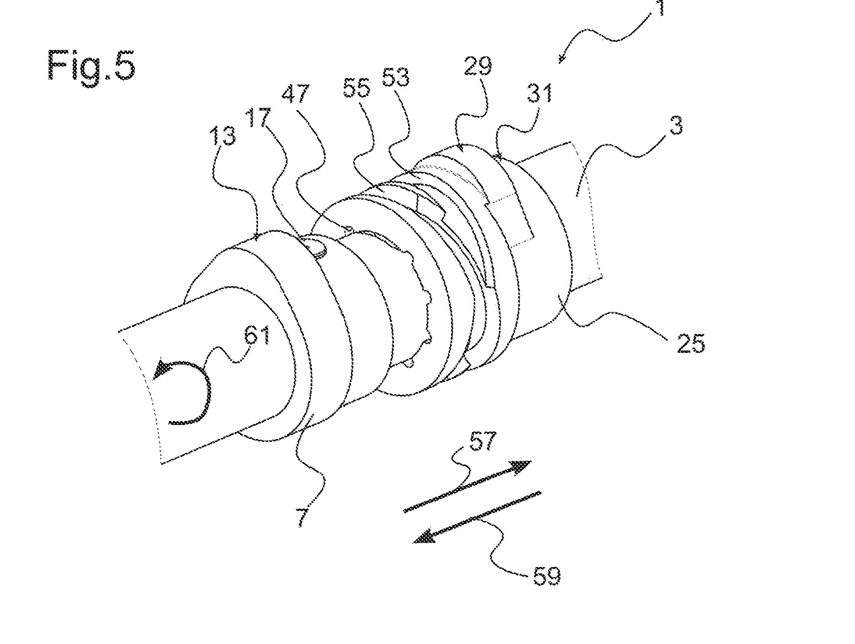
FIG. 5 is a perspective view of a second example camshaft.

FIG. 5 shows a second embodiment of the camshaft 1 according to the invention. The variant of the camshaft 1 shown differs from FIG. 4 solely in the design of the slotted link tracks 53 and 55. The slotted link tracks 53 and 55 each effect a movement during an entire rotation. In order to implement a compact design, the two slotted link tracks are designed to be overlapping in this variant. For example, the slotted link tracks can be implemented as described in DE102007051739A1 or DE102010033087A1.

Figure 6:
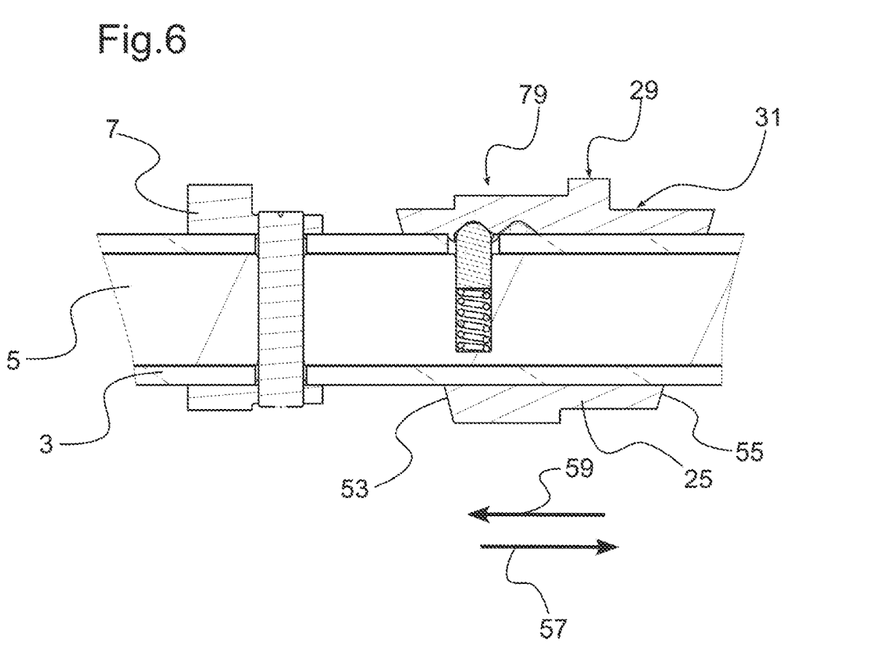
FIG. 6 is a longitudinal section view of a third example camshaft.

FIG. 6 shows a longitudinal section of a third embodiment of the camshaft 1 according to the invention. The depiction is substantially identical to FIG. 1. In contrast to FIG. 1, the third embodiment does not have groove-shaped slotted link tracks. Instead, the first slotted link track 53 is designed in the form of a face of the second cam segment 25, extending obliquely at least in regions, and facing away from the first cam segment 7. To move the second cam segment 25, a stationary pin is brought into contact radially with the slotted link track 53. This occurs in a region of the slotted link track 53 at which the distance of the slotted link track to the first cam segment does not have the minimum value thereof. During rotation of the camshaft 1, the slotted link track 53 slides along on the pin. Since the pin is stationary in the axial direction, the slotted link track 53 is displaced, and therefore the second cam segment 7 moves away from the first cam segment 7 in the first axial direction 57. Similarly, a displacement of the second cam segment 25 in the second axial direction 59 toward the first cam segment 7 can also be effected. For this, the second slotted link track 55 is designed in the form of a face of the second cam segment 25, extending obliquely at least in regions, and facing away from the first cam segment.

Furthermore, FIG. 6 shows a region 79 of the second cam segment 25, which is designed as a bearing point for bearing the camshaft in a bearing receptacle of a combustion engine.

Figure 7:
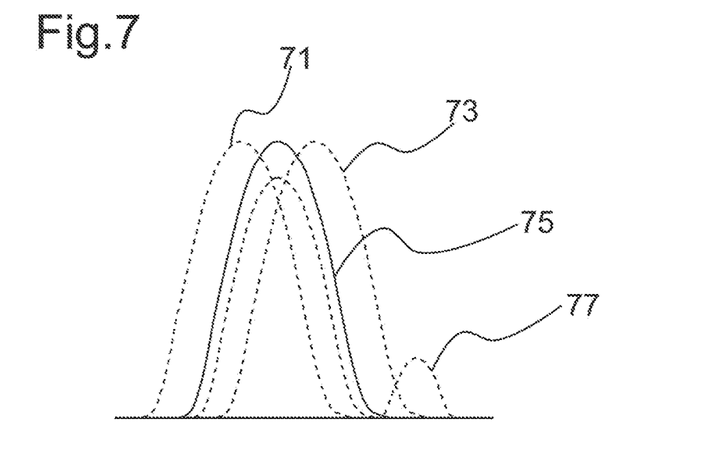
FIG. 7 is a graph showing example valve stroke curves.

FIG. 7 shows the operating principle of the camshaft in connection with valve stroke curves. The rotation angle of the bearing shaft is applied to the horizontal axis, and the valve stroke in length units to the vertical axis. The valve stroke curves belonging to the first cam segment 7 are shown as dotted lines and denoted with 71 or, respectively, 73. Since the rotation angle of the bearing shaft is applied to the horizontal axis, a twisting of the first cam segment 7 relative to the bearing shaft 3 corresponds to a horizontal displacement of the valve stroke curve. The first cam segment 7 can be continually varied between two extreme rotation positions. In the first extreme rotation position, the valve stroke curve 71 is effected; in the second extreme rotation position, the valve stroke curve 73. Both valve stroke curves 71 and 73 have an identical course. The horizontal distance between the two valve stroke curves 71 and 73 equals 30° in this case. This is the maximum rotation angle by which the first cam segment 7 can be twisted relative to the bearing shaft 3. The numerical value depends on the exact requirements. Typically, the numerical value is a compromise between a maximum possible flexibility, having a large maximum rotation angle, and high stability of the bearing shaft 3. The larger the rotation angle, the larger the openings 11 and 12 must also be in the circumferential direction. This reduces the stability of the bearing shaft.

The solid line shows the valve stroke curve 75 of the second cam segment 25 in the first operating mode, in which the first cam contour 29 is active. In the variant shown, the valve stroke curve 75 has, as an example, the same course as the valve stroke curves 71 and 73. It is possible to switch to a second operating mode, in which the cam contour 31 is active, by axially displacing the second cam segment 25. This case results in the dashed valve stroke curve 77, in which the valve first opens during a revolution of the camshaft 1, then is closed and then opened slightly another time. Since the second cam segment 25 can only assume a discrete number of positions (two different positions in each of the variants shown), only discrete valve stroke curves 75 and 77 are possible, between which switching can occur. In contrast, the precise form of the valve stroke curves 75 and 77 can be freely determined during production of the second cam segment 25.

Figure 8:
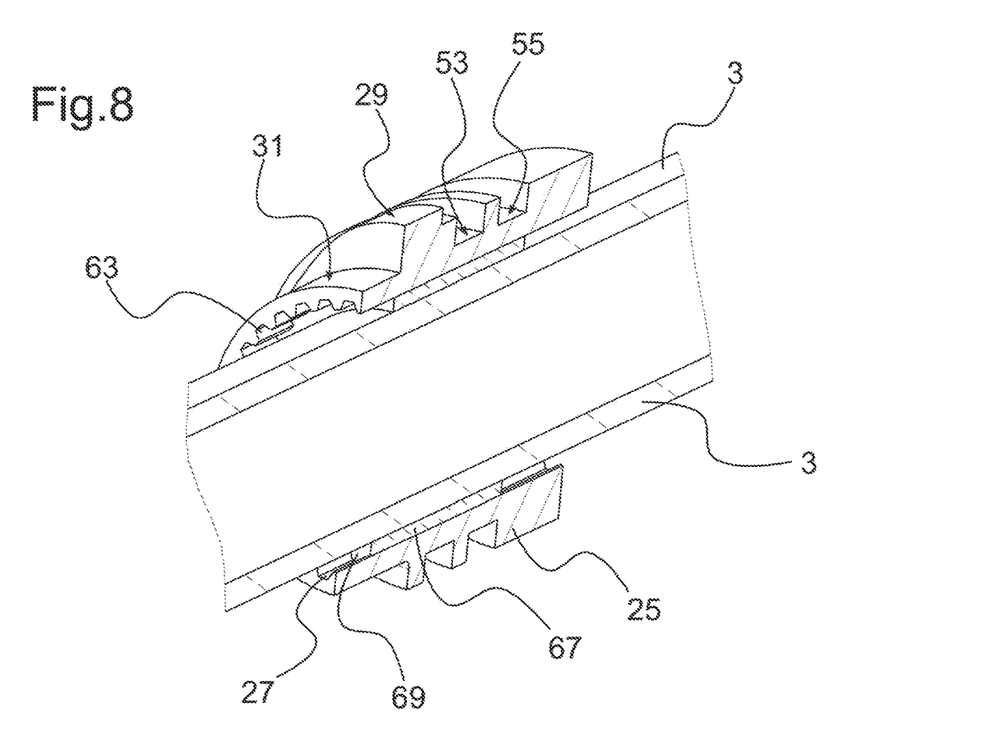
FIG. 8 is a sectional view of an example camshaft.

FIG. 8 shows design variants as examples in which the described camshaft can be used. A section through a bearing shaft 3, which has a second cam segment 25, is shown. Instead of the indentations having bearing bodies, a gearing 63 is arranged on the inner side of the second recess 27 in this variant. Furthermore, the outer side of the bearing shaft 3 has a gearing 69, wherein the two gearings 63 and 69 intermesh. The tooth grooves of the two gearings extend in the axial direction, so that an axial displacement of the second cam segment 25 on the bearing shaft 3 is enabled and a twisting of the second cam segment 25 relative to the bearing shaft 3 is prevented. The gearing 69 can be designed integral with the bearing shaft 3 or, as shown, in the form of a pressed-on gear ring 67.

Figure 9:
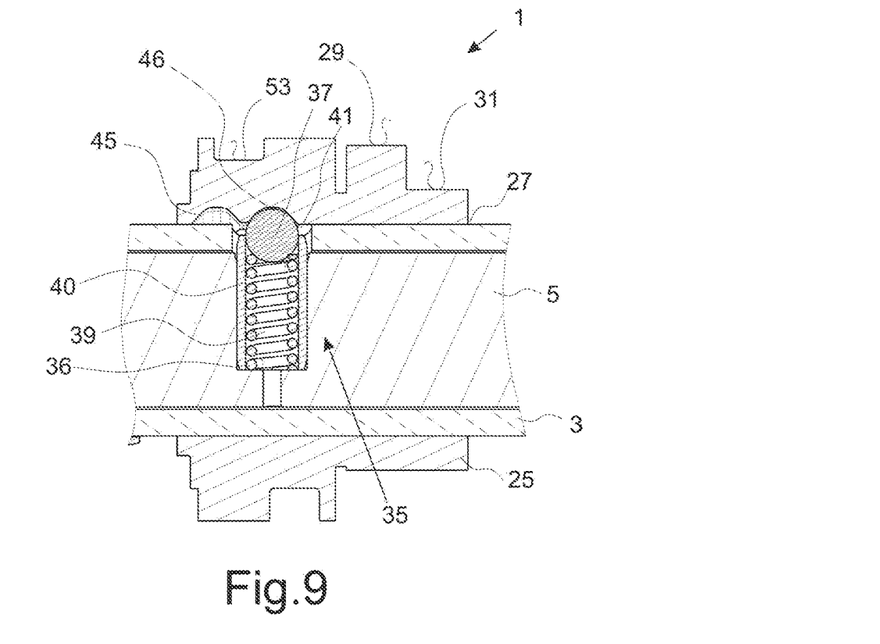
FIG. 9 is a longitudinal section view of a fourth example camshaft.

FIG. 9 shows a longitudinal section of an additional, particularly fourth embodiment of the camshaft 1 according to the invention. The camshaft 1 comprises, like the first embodiment of a camshaft 1 according to the invention shown in FIG. 1, a bearing shaft 3, which is designed as a hollow shaft, and an inner shaft 5, which is arranged concentrically to the bearing shaft 3. Thereby, the inner shaft 5 is twistable relative to the bearing shaft 3. At least one cam segment 25 having a first recess 27 for receiving the bearing shaft 3 is arranged on the bearing shaft 3.

The cam segment 25 has a first cam contour 29 and a second cam contour 31, which are offset to each other in the axial direction. According to the invention, the cam segment 25, which is also denoted as the second cam segment 25 according to the invention, is axially displaceable relative to the inner shaft 5 and to the bearing shaft 3. The cam segment 25 is thus displaceable to the right (in this depiction), so that the first cam contour 29 moves to the axial position of the second cam contour 31, whereby the activity from the second cam contour 31 is transferred to the first cam contour 29. This means that the first cam contour 29 is active as a result, since it is located at the correct axial position in order to effect an activation of a cylinder valve. The two cam contours 29 and 31 differ, for example, at least in the stroke height, so that the cylinder valve is activated with different intensity depending on the position of the cam segment 25, or in the angle position, so that the cylinder valve is activated at different times depending on the position of the cam segment 25, or that a cylinder deactivation occurs due to a zero stroke design. It is also possible that the cam contours have a different length in respect of the contour region, so that the activation duration of the cylinder valve differs.

In order to fixate the cam segment 25 at the desired axial position, there is a latching means 35 which latches the cam segment 25 at a plurality of axial positions. The latching means 35 comprises a sleeve 40, which is arranged in a bore 36 in the inner shaft 5, and a spring-loaded latching body 37. The latching means 35 is thus arranged at least in part inside the inner shaft 5. The sleeve 40, which extends at least in sections along the bore 36, advantageously serves as an optimized guide or guiding length of the latching body 37. The latching body 37 is mounted so as to move in the radial direction. The latching body 37 is advantageously a standard part, such as a sphere or a spherical body, whereby production of the latching means and the camshaft according to the invention is advantageously enabled at reduced cost. Said radial movement of the latching body 37 occurs under compression of the spring 39. The spring-loaded latching body 37 extends through a latching opening 41 in the bearing shaft 3 and engages in a latching groove 46 in the inner side of the second recess 27 of the cam segment 25. If the second cam segment 25 is displaced toward the second operating mode (that is, to the right), the spring 39 is first compressed in order to enable the displacement. At the allocated axial position, the spring 39 then engages the latching body 37 together with the other latching groove 45 and thereby fixates the axial position. Both the latching opening 41 and the two latching grooves 45 and 46 each have an extension in the circumferential direction which is larger than the extension of the latching body 37 in the circumferential direction, so that the latching body 37 and, advantageously, the sleeve 40 do not hinder a twisting of the inner shaft 5 relative to the bearing shaft 3. The latching grooves 45 and 46 can also be designed to be completely circumferential. This then enables a simpler method of production. The bore 36 for the latching body 37 is advantageously a pocket bore.

The axial displacement of the cam segment 25 is effected by means of at least one slotted link track 53, such as described with reference to FIG. 4, for example.

Figure 10:
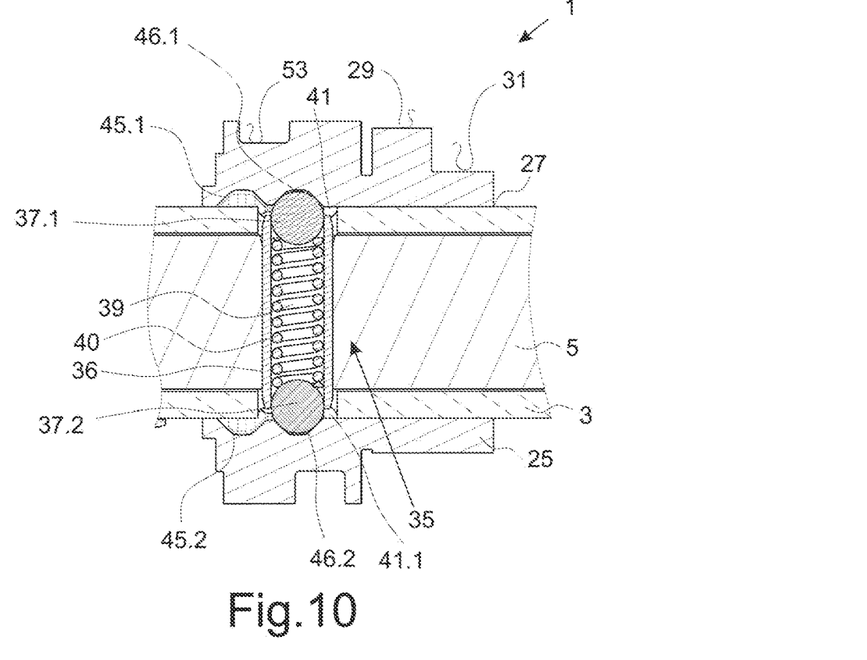
FIG. 10 is a longitudinal section view of a fifth example camshaft.

FIG. 10 shows a longitudinal section of an additional, particularly fifth embodiment of the camshaft 1 according to the invention, which differs from the embodiment shown in FIG. 9 solely in that the latching means 35 has two latching bodies, 37.1 and 37.2, and the sleeve 40 is arranged within a bore 36, which extends completely through the inner shaft 5 in the shape of a through-bore. According to the invention, the sleeve 40 also extends completely through the inner shaft 5 so that the sleeve longitudinal axis is aligned substantially orthogonally to the inner shaft longitudinal axis. The bearing shaft consequently also has a latching opening 41.1 and a second latching opening 41.2, which is designed substantially opposite the first latching opening 41.1. The spring-loaded latching bodies 37.1, 37.2 each extend through a latching opening 41.1, 41.2 in the bearing shaft 3 and engage in a corresponding latching groove 46.1, 46.2 in the inner side of the second recess 27 of the cam segment 25. If the cam segment 25 is displaced to the right, for example, the spring 39 is first compressed in order to enable the displacement. The latching bodies 37.1, 37.2 are moved into the bore 36 of the inner shaft 5 at least in part, wherein the movement thereof is limited due to the sleeve 40. It is conceivable that the sleeve 40 advantageously serves as a stop element for at least one of the latching bodies 37.1, 37.2. In this case, it is possible that the sleeve 40 limits the movement of at least one of the latching bodies 37.1, 37.2, at least in the radial direction, proceeding from a central longitudinal axis of the sleeve 40, or in the longitudinal direction, meaning along the central longitudinal axis of the sleeve. At the allocated axial position, the spring 39 then engages the latching bodies 37.1 and 37.2 together with the other latching grooves 45.1 and 45.2 and thereby fixates the axial position.

Furthermore, a spring 39 extends through the sleeve 40 and, consequently, through the through-bore 36. One latching body 37.1, 37.2 is arranged at each end of the spring 39, so that the two latching bodies 37.1, 37.2 are arranged opposite each other, each at an inlet or outlet of the bore 36. The latching bodies 37.1, 37.2, for example, are standard parts, such as spherical latching bodies or balls. It is also possible, however, that the latching bodies 37.1, 37.2 are designed in the form of a ball plunger, particularly as shown in FIG. 11, for example.

The embodiment of the latching means 35 having two latching bodies 37.1 and 37.2 advantageously serves for optimized functionality of the camshaft and particularly for twisting or displacing of the cam segments of the camshaft, since the cam segment 25 is not, as in the preceding embodiments, supported relative to the inner shaft 5, but rather designed to be self-contained. This advantageously leads to a reduction and particularly advantageously to a nullification of the force or forces enacting on the inner shaft 5.

Figure 11:
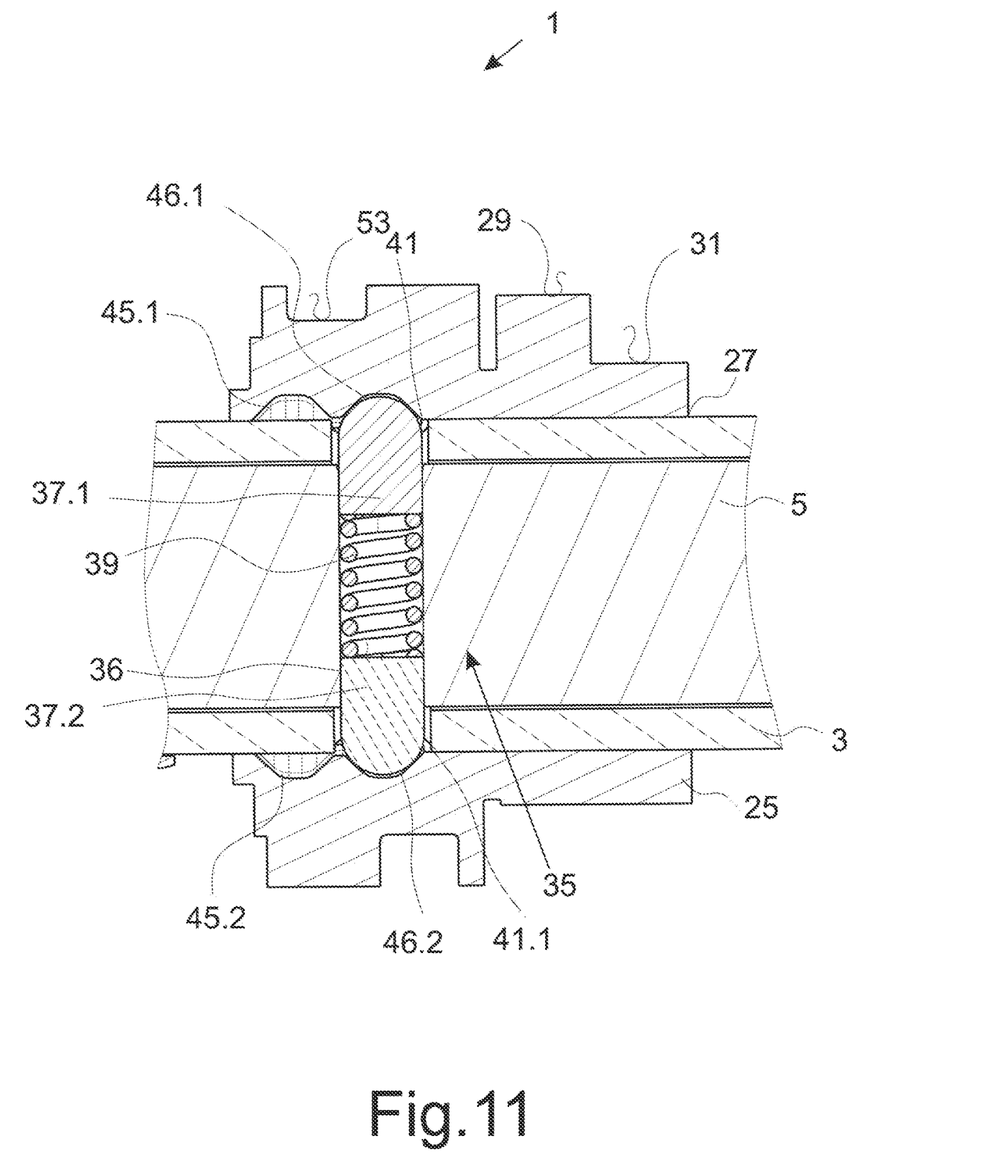
FIG. 11 is a longitudinal section view of a sixth example camshaft.

FIG. 11 shows a longitudinal section of an additional, particularly sixth embodiment of the camshaft 1 according to the invention, which differs from the embodiment shown in FIG. 10 solely in that ball plunger latching bodies 37.1, 37.2 are arranged instead of spherical latching bodies 37.1, 37.2. This has the advantage that the bore 36 extending through the inner shaft 5 can have smaller dimensions (smaller bore diameter) than the bore 36 shown in the embodiment in FIG. 10. This advantageously causes an installation space improvement of the latching means 35. It is furthermore conceivable that the latching means extends solely through a bore 36, particularly a through-bore, as shown in FIG. 11. It is also conceivable, however, that, as shown in FIG. 10, a sleeve 40 additionally extends through said bore 36, so that the guiding of the latching bodies 37.1, 37.2 and particularly the guiding length of the latching bodies 37.1, 37.2 is improved in comparison to a design without a sleeve 40.

What is claimed is:

1. A camshaft comprising:
    a bearing shaft configured as a hollow shaft;
    an inner shaft disposed concentrically within an interior of the bearing shaft, wherein the inner shaft is twistable relative to the bearing shaft;
    a first cam segment with a first recess that receives the bearing shaft, wherein the first cam segment is disposed rotatably on the bearing shaft, wherein the first cam segment is axially connected to the inner shaft in a rotationally fixed manner;
    a second cam segment with a second recess that receives the bearing shaft and with at least two cam contours, wherein the second cam segment is fastened on the bearing shaft so that the second cam segment is connected to the bearing shaft in a rotationally fixed manner, wherein the second cam segment is axially displaceable along the bearing shaft; and
    a latching means for latching the second cam segment at a plurality of axial positions.

2. The camshaft of claim wherein the latching means is disposed at least in part within the inner shaft.

3. The camshaft of claim wherein the latching means latches the second cam segment relative to the inner shaft.

4. The camshaft of claim wherein for latching the second cam segment the latching means comprises a bore in the inner shaft with a spring-loaded latching body that is displaceable in a radial direction, wherein the spring-loaded latching body extends through a latching opening in the bearing shaft and engages a latching groove in an inside of the second recess of the second cam segment.

5. The camshaft of claim 4 wherein the latching opening in the bearing shaft and the latching groove each have an extension in a circumferential direction that is larger than an extension of the spring-loaded latching body in the circumferential direction so that the spring-loaded latching body does not hinder twisting of the inner shaft relative to the bearing shaft.

6. The camshaft of claim 5 wherein the latching groove is circumferential.

7. The camshaft of claim 1 wherein an inside of the second recess of the second cam segment and an outside of the bearing shaft have indentations opposite one another, the indentations producing hollow chambers in which bearing bodies are disposed.

8. The camshaft of claim 7 wherein the indentations have a larger extension in an axial direction than the bearing bodies to enable an axial displacement of the second cam segment on the bearing shaft.

9. The camshaft of claim 7 wherein the indentations have an extension in a circumferential direction that substantially corresponds to an extension of the bearing bodies in the circumferential direction to prevent twisting of the second cam segment relative to the bearing shaft.

10. The camshaft of claim 1 wherein the second cam segment includes a first slotted link track for moving the second cam segment in a first axial direction and a second slotted link track for moving the second cam segment in a second axial direction that is opposite the first axial direction.

11. The camshaft of claim 10 wherein at least one of the first slotted link track or the second slotted link track is groove-shaped.

12. A camshaft comprising:
    a bearing shaft configured as a hollow shaft;
    an inner shaft disposed concentrically within an interior of the bearing shaft, wherein the inner shaft is twistable relative to the bearing shaft;
    a first cam segment with a first recess that receives the bearing shaft, wherein the first cam segment is disposed rotatably on the bearing shaft, wherein the first cam segment is axially connected to the inner shaft in a rotationally fixed manner, wherein the first cam segment is axially connected to the inner shaft in a rotationally fixed manner by a connection means; and
    a second cam segment with a second recess that receives the bearing shaft and with at least two cam contours, wherein the second cam segment is fastened on the bearing shaft so that the second cam segment is connected to the bearing shaft in a rotationally fixed manner, wherein the second cam segment is axially displaceable along the bearing shaft.

13. The camshaft of claim 12 wherein an inside of the second recess of the second cam segment and an outside of the bearing shaft have indentations opposite one another, the indentations producing hollow chambers in which bearing bodies are disposed.

14. The camshaft of claim 13 wherein the indentations have a larger extension in an axial direction than the bearing bodies to enable an axial displacement of the second cam segment on the bearing shaft.

15. The camshaft of claim 13 wherein the indentations have an extension in a circumferential direction that substantially corresponds to an extension of the bearing bodies in the circumferential direction to prevent twisting of the second cam segment relative to the bearing shaft.

16. The camshaft of claim 12 wherein the second cam segment includes a first slotted link track for moving the second cam segment in a first axial direction and a second slotted link track for moving the second cam segment in a second axial direction that is opposite the first axial direction.

17. The camshaft of claim 16 wherein at least one of the first slotted link track or the second slotted link track is groove-shaped.

* * * * *